United States Patent
Han (10) Patent No.: US 11,659,141 B2
(45) Date of Patent: May 23, 2023

(54) IMAGE PROCESSING APPARATUS AND METHOD

(71) Applicant: HANWHA TECHWIN CO., LTD., Seongnam-Si (KR)

(72) Inventor: Yuoonman Han, Seongnam-Si (KR)

(73) Assignee: HANWHA TECHWIN CO., LTD., Seongnam-Si (KR)

( * ) Notice: Subject to any disclaimer, the term of this patent is extended or adjusted under 35 U.S.C. 154(b) by 251 days.

(21) Appl. No.: 17/009,639

(22) Filed: Sep. 1, 2020

(65) Prior Publication Data

US 2021/0160415 A1    May 27, 2021

(30) Foreign Application Priority Data

Nov. 22, 2019  (KR) .................. 10-2019-0151395
Jul. 29, 2020  (KR) .................. 10-2020-0094365

(51) Int. Cl.
*H04N 7/18*  (2006.01)
*H04N 23/71*  (2023.01)
*G06T 5/20*  (2006.01)
*G06V 10/25*  (2022.01)

(52) U.S. Cl.
CPC .............. *H04N 23/71* (2023.01); *G06T 5/20* (2013.01); *G06V 10/25* (2022.01); *H04N 7/18* (2013.01)

(58) Field of Classification Search
CPC .... H04N 5/2351; H04N 7/18; H04N 5/23229; H04N 7/181; G06T 5/20; G06V 10/25
USPC .......................................... 348/222.1
See application file for complete search history.

(56) References Cited

U.S. PATENT DOCUMENTS 8,107,759 B2    1/2012  Park et al.
2020/0118248 A1*  4/2020  Deng ................. G06T 5/50

FOREIGN PATENT DOCUMENTS

| KR | 10-0819288 | 4/2008 |
| KR | 10-2015-0069343 | 6/2015 |
| KR | 10-2016-0056729 | 5/2016 |
| KR | 10-1778461 | 9/2017 |

* cited by examiner

*Primary Examiner* — Stephen P Coleman
(74) *Attorney, Agent, or Firm* — Sughrue Mion, PLLC

(57) ABSTRACT

Provided is an image processing apparatus including: a region comparison unit configured to receive first luminance information corresponding to a first image signal and second luminance information corresponding to a second image signal, and to generate third luminance information by using the first and second luminance information; a region determination unit configured to calculate a brightness level value for the first image signal by using the first luminance information; a reliability determination unit configured to calculate a reliability determination value for the first image signal by using the first luminance information; an extraction unit configured to generate a luminance correction threshold value of the first image signal by using the brightness level value and the reliability determination value; and an interpolation unit configured to output corrected luminance information for the first luminance information by using the luminance correction threshold value and the third luminance information.

20 Claims, 3 Drawing Sheets

IMAGE PROCESSING APPARATUS AND METHOD

CROSS REFERENCE TO RELATED APPLICATIONS

This application claims priority from and the benefit of Korean Patent Application No. 10-2019-0151395, filed on Nov. 22, 2019 and Korean Patent Application No. 10-2020-0094365, filed on Jul. 29, 2020, which are hereby incorporated by reference for all purposes as if fully set forth herein.

BACKGROUND

Field

Exemplary embodiments/implementations of the invention relate generally to a monitoring camera system, and more particularly, to an image processing apparatus and method applied to a monitoring camera system.

Discussion of the Background

Recently, a monitoring camera system is generally installed inside or outside a building, on the street, and the like for various purposes such as crime prevention, security, and store management. In such a monitoring camera system, a plurality of cameras may be connected to each other via a network in a wired or wireless manner to perform a function as a network camera.

In transmitting image data photographed by the monitoring camera, various compression technologies may be used in order to reduce the amount of transmission of the image data. As an example, it may be possible to use a method of maximizing a transmission compression rate by dividing the image data to be transmitted into a plurality of blocks, decreasing the compression rate of a block including a region having a lot of motion among the blocks, and increasing the compression rate of a block including a region having little motion among the blocks.

Furthermore, since the monitoring cameras used in the network-based monitoring camera system are often required to operate 24 hours, it is necessary to generate an image having a certain quality or more even in a low-light environment such as a dark place or at night, but it is highly probable that noise will occur in an image in the low-light environment. As a method for improving the quality of the image data, a method of boosting the luminance of a part (block) with a high amount of change in the image may be used. However, such an image quality improvement method has a problem in that it does not consider the aforementioned transmission compression rate.

Accordingly, when a block including a low-light region is boosted, invisible low-light noise may also be boosted, which may result in problems that the compression rate is decreased or the quality of an image is degraded.

The above information disclosed in this Background section is only for understanding of the background of the inventive concepts, and, therefore, it may contain information that does not constitute prior art.

SUMMARY

Various embodiments are directed to providing an image processing apparatus and method applied to a monitoring camera system, capable of increasing a transmission compression rate of image data by suppressing a boosting phenomenon applicable to low-light noise while reducing loss of original image data.

Additional features of the inventive concepts will be set forth in the description which follows, and in part will be apparent from the description, or may be learned by practice of the inventive concepts.

In order to achieve the above objects, an image processing apparatus according to an embodiment of the inventive concepts includes: a region comparison unit configured to receive first luminance information corresponding to a first image signal and second luminance information corresponding to a second image signal, and to generate third luminance information by using the first luminance information and the second luminance information; a region determination unit configured to calculate a brightness level value for the first image signal by using the first luminance information; a reliability determination unit configured to calculate a reliability determination value for the first image signal by using the first luminance information; an extraction unit configured to generate a luminance correction threshold value of the first image signal by using the brightness level value of the first image signal, which is output from the region determination unit, and the reliability determination value of the first image signal, which is output from the reliability determination unit; and an interpolation unit configured to output corrected luminance information for the first luminance information by using the luminance correction threshold value and the third luminance information.

The first image signal may be an original image signal of a first image block among received image signals of one frame, and the second image signal may be an image signal of the first image block, which is filtered by a filter.

The first image block may be implemented as a single pixel or may be implemented as a predetermined region including a plurality of pixels.

The filter may be implemented as a bandpass filter.

The region comparison unit may generate the third luminance information $I_C$ through Equation 1 below, $$
\begin{aligned}
&\text{Equation 1}\\
&\text{If} \quad I_E > I_{max} \quad I_C = I_{max}\\
&\text{Else if} \quad I_E < I_{min} \quad I_C = I_{min}\\
&\text{Else} \quad I_C = I_E
\end{aligned}
$$

in Equation 1 above, $I_E$ denotes the second luminance information, $I_{max}$ denotes a maximum luminance value of image blocks including the first image signal, Imin denotes a minimum luminance value of the image blocks including the first image signal, and $I_C$ denotes the third luminance information.

The brightness level ($Y_{avg}$) value calculated by the region determination unit may be an average luminance value of the first image block.

The reliability determination value calculated by the reliability determination unit may correspond to a result obtained by comparing luminance of the first image block and luminance of surrounding pixels of the first image block, and as a difference between the luminance of the first image block and the luminance of the surrounding pixels is smaller, a low reliability determination value may be calculated, and as the difference between the luminance of the first image block and the luminance of the surrounding pixels is larger, a high reliability determination value may be calculated.

The extraction unit may calculate the luminance correction threshold value Th(x) through Equation 4 below, $$Th(x)=n(x)*k^{-(Yavg)}$$ Equation 4 in Equation 4 above, $Y_{avg}$ denotes the brightness level value calculated by the region determination unit, n(x) denotes the reliability determination value calculated by the reliability determination unit, and k denotes an arbitrary constant, and the luminance correction threshold value Th(x) may be included in a range larger than 0 and smaller than 1.

As the difference between the luminance of the first image block and the luminance of the surrounding pixels is larger, the first image block may be determined to be noise and the luminance correction threshold value may be calculated as a high value close to 1.

The interpolation unit calculates the corrected luminance information $Y_{out}$ for the first luminance information $Y_1$ through Equation 5 below, $$Y_{out}=I_C*Th(x)+I_E*(1-Th(x))$$ Equation 5 in Equation 5 above, $I_C$ denotes the third luminance information, Th(x) denotes the luminance correction threshold value, and $I_E$ denotes the second luminance information.

An image processing method according to another embodiment of the inventive concepts includes the steps of: receiving first luminance information $Y_1$ corresponding to a first image signal and second luminance information $I_E$ corresponding to a second image signal, and generating third luminance information $I_C$ by using the first luminance information and the second luminance information; calculating a brightness level ($Y_{avg}$) value for the first image signal by using the first luminance information; calculating a reliability determination value n(x) for the first image signal by using the first luminance information; generating a luminance correction threshold value Th(x) of the first image signal by using the brightness level ($Y_{avg}$) value of the first image signal and the reliability determination value of the first image signal; and outputting corrected luminance information for the first luminance information by using the luminance correction threshold value and the third luminance information.

The first image signal may be an original image signal of a first image block among received image signals of one frame.

The second image signal may be an image signal of the first image block, which is filtered by a filter.

The first image block may be implemented as a single pixel or may be implemented as a predetermined region including a plurality of pixels.

The third luminance information $I_C$ may be generated through Equation 1 below,

| Equation 1 |
| --- |
| If $I_E > I_{max}$ $I_C = I_{max}$ |
| Else if $I_E < I_{min}$ $I_C = I_{min}$ |
| Else $I_C = I_E$ | in Equation 1 above, $I_E$ denotes the second luminance information, $I_{max}$ denotes a maximum luminance value of image blocks including the first image signal, $I_{min}$ denotes a minimum luminance value of the image blocks including the first image signal, and $I_C$ denotes the third luminance information.

The brightness level ($Y_{avg}$) value may be an average luminance value of the first image block.

The reliability determination value may correspond to a result obtained by comparing luminance of the first image block and luminance of surrounding pixels of the first image block, and as a difference between the luminance of the first image block and the luminance of the surrounding pixels is smaller, a low reliability determination value may be calculated, and as the difference between the luminance of the first image block and the luminance of the surrounding pixels is larger, a high reliability determination value may be calculated.

The luminance correction threshold value Th(x) may be calculated through Equation 4 below, $$Th(x)=n(x)*k^{-(Yavg)}$$ Equation 4 in Equation 4 above, $Y_{avg}$ denotes the brightness level value calculated by a region determination unit, n(x) denotes the reliability determination value calculated by the reliability determination unit, and k denotes an arbitrary constant, and the luminance correction threshold value Th(x) may be included in a range larger than 0 and smaller than 1.

As the difference between the luminance of the first image block and the luminance of the surrounding pixels is larger, the first image block may be determined to be noise and the luminance correction threshold value may be calculated as a high value close to 1.

The corrected luminance information $I_{out}$ for the first luminance information Yin may be calculated through Equation 5 below, $$Y_{out}=I_C*Th(x)+I_E*(1-Th(x))$$ Equation 5 in Equation 5 above, $I_C$ denotes the third luminance information, Th(x) denotes the luminance correction threshold value, and $I_E$ denotes the second luminance information.

According to the embodiments of the inventive concepts described above, it is possible to increase a transmission compression rate of image data by suppressing a boosting phenomenon applicable to low-light noise while reducing loss of original image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Each block in the accompanying block diagram may also be performed by computer program instructions (execution engines), and these computer program instructions may be mounted on a processor of a general-purpose computer, a special-purpose computer, or another programmable data processing equipment. Thus, the instructions executed through the processor of the computer or the another programmable data processing equipment generate means for performing functions described in each block of the block diagram.

These computer program instructions can also be stored in a computer-usable or computer-readable memory that can be directed to the computer or the another programmable data processing equipment in order to implement functions in a specific way. Therefore, the instructions stored in the computer-usable or computer-readable memory can also produce a manufacturing article including instruction means for performing the functions described in each block of the block diagram.

Furthermore, the computer program instructions may be mounted on the computer or the another programmable data processing equipment. Therefore, the instructions, which generate a process, in which a series of operation steps are performed on the computer or the another programmable data processing equipment and executed by the computer, and execute the computer or the another programmable data processing equipment, can also provide functions for performing the functions described in each block of the block diagram.

Furthermore, each block may represent a part of a module, a segment, or a code including one or more executable instructions for performing specific logical functions, and functions mentioned in blocks or steps can also occur out of order in some alternative embodiments.

That is, two blocks illustrated can also be executed at substantially the same time, and can also be executed in the reverse order of a corresponding function as necessary.

The terms used herein are for the purpose of not limiting but describing specific embodiments. Throughout the specification, when a certain part is referred to as "including" a certain component, it indicates that the part may not exclude but further include other components, unless otherwise stated. Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an embodiment of the inventive concepts will be described in more detail with reference to the accompanying drawings.

Figure 1:
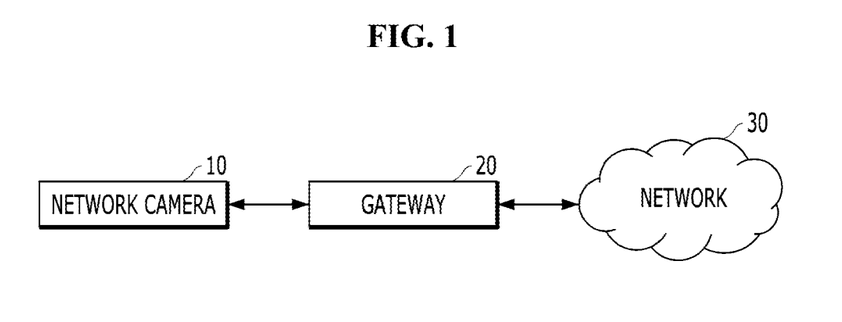
FIG. 1 is a block diagram schematically illustrating a configuration of a monitoring camera system according to an embodiment of the inventive concepts.

FIG. 1 is a block diagram schematically illustrating a configuration of a monitoring camera system according to an embodiment of the inventive concepts.

Referring to FIG. 1, the monitoring camera system according to the embodiment of the inventive concepts may include a network camera 10, a gateway 20, and a network 30. Although FIG. 1 illustrates one network camera 10 for convenience of description, it is obvious to those skilled in the art that the network camera 10 may be implemented in a plural number.

The monitoring camera system may provide a configuration in which information of the network camera 10 collected in the gateway 20 is transmitted to a server through the network 30, and an administrator may monitor the information transmitted to the server by using a monitor terminal.

The network camera 10 may acquire an image of a monitoring region by photographing the monitoring region, and may photograph the monitoring region in realtime for the purpose of monitoring or security.

The network camera 10 may be a PTZ camera in which panning and tilting are possible and a zoom magnification of a lens can be adjusted. As an example, the network camera 10 may be a fisheye camera having an angle of view of 180° or more. An image photographed by the fisheye camera may have various distortions as a wide-angle image.

Furthermore, the network camera 10 may be a battery-powered low-power camera. The low-power camera maintains a sleep mode at normal times and periodically wakes up to check whether an event has occurred. The low-power camera is switched to an active mode when the event occurs and returns to the sleep mode when no event occurs. As described above, the low-power camera can reduce power consumption by maintaining the active mode only when an event occurs.

The network camera 10 may communicate with the gateway 20 by using various communication methods such as wired and wireless local area network (LAN), Wi-Fi, ZigBee, Bluetooth, and near field communication. For example, the network camera 10 may communicate with the gateway 20 according to a low-power wireless communication protocol using a radio frequency of an industrial scientific medical (ISM) band.

The gateway 20 may recognize the state of the network camera 10 on the basis of information transmitted from the network camera 10, and transmit instructions or alarms to another network camera 10 or a server according to the recognized state of the network camera 10. The gateway 20 may also transmit information to the server or receive instructions from the server by using various wired and wireless communication methods such as Ethernet, WiFi, and Bluetooth. The network 30 may include a wired network or a wireless network. The wireless network may include a 2 generation (2G) or 3G cellular communication system, a $3^{rd}$ generation partnership project (3GPP), a 4G communication system, a long-term evolution (LTE), and a world interoperability for microwave access (WiMAX).

Figure 2:
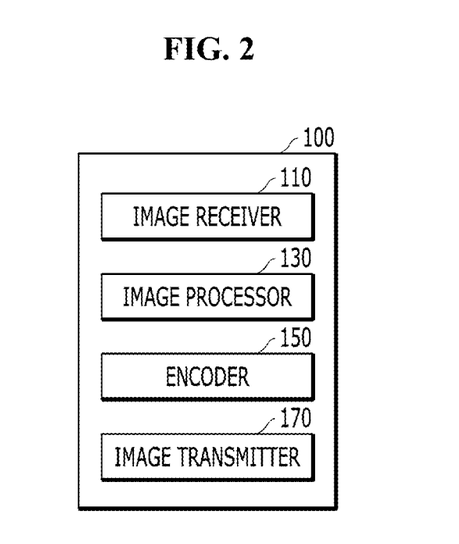
FIG. 2 is a block diagram illustrating a configuration of an image processing apparatus according to an embodiment of the inventive concepts.
Figure 3:
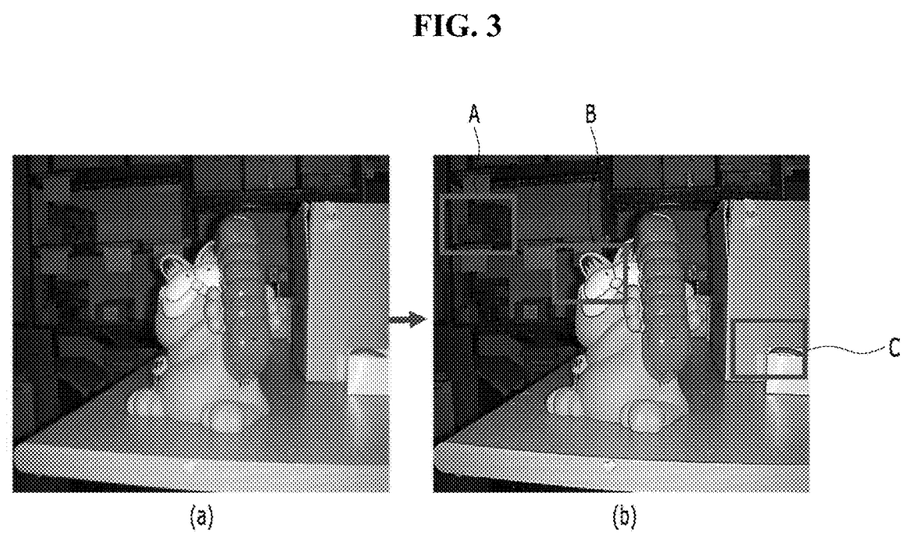
FIG. 3 is a diagram for explaining an example of an image generated by image processing according to an embodiment of the inventive concepts.

FIG. 2 is a block diagram illustrating a configuration of an image processing apparatus 100 according to the embodiment of the inventive concepts, and FIG. 3 is a diagram for explaining an example of an image generated by image processing according to the embodiment of the inventive concepts.

Referring to FIG. 2, the image processing apparatus 100 according to the embodiment of the inventive concepts may include an image receiver 110, an image processor 130, an encoder 150, and an image transmitter 170.

The image processing apparatus 100 may be included in the network camera 10 or the gateway 20 illustrated in FIG. 1; however, the embodiment of the inventive concepts is not limited thereto.

The image receiver 110 receives image data from a camera module (for example, a lens assembly) included in the network camera 10. As an example, the image receiver 110 may be a camera module such as a charge-coupled device (CCD) module and a complementary metal-oxide semiconductor (CMOS) module. Furthermore, the image receiver 110 may be a communication interface that receives an image from the network camera 10. In such a case, image data received through the image receiver 110 may be image signals of one frame including a plurality of image blocks.

The image processor 130 may process the image data received from the camera module and transmit the processed image data to the encoder 150. In the case of the embodiment of the inventive concepts, the image processor 130 may emphasize an edge of the image signal received through the image receiver 110. In such a case, the edge of the received image signal may indicate an edge portion of an object displayed on an image of one frame. In the embodiment of the inventive concepts, in order to emphasize the edge of the image of one frame, that is, in order to emphasize the edge portion of the object, a technique (sharpening) of boosting the luminance of a region having a large change in the brightness of the image may be applied.

Such a sharpening technique may use a bandpass filter and luminance information for each block of an image. The bandpass filter may be implemented by combining a high pass filter and a low pass filter. Among the image data, high-frequency image data refers to image data corresponding to a region, where brightness changes from a low value to a high value or from a high value to a low value, among image signals of one frame, whereas low-frequency image data refers to image data corresponding to a region, where there is no brightness change, among the image signals of one frame. Accordingly, the sharpening technique using the bandpass filter refers to a technique of obtaining a visually clear image by boosting a region having a large change amount of luminance and reducing noise.

(a) of FIG. 3 illustrates an image of one frame displaying image data before the sharpening technique is applied, and (b) of FIG. 3 illustrates an image of one frame displaying image data after the sharpening technique is applied.

Furthermore, in (b) of FIG. 3, a first image block A is a block including a region where low-luminance image data is displayed, a second image block B is a block including a region where image data of a high-frequency region, that is, a region having a large change amount of luminance is displayed, and a third image block C is a block including a region where high-luminance image data is displayed.

Referring to (a) of FIG. 3 and (b) of FIG. 3, it is possible to confirm a result obtained by boosting the luminance of an edge portion of an object displayed on an image of one frame, that is, a high-frequency region having a large change amount of luminance (for example, the second image block B) through the application of the sharpening technique.

The encoder 150 may compress the image processed through the image processor 130. As an example, the image compression by the encoder 150 may use a technique of comparing a current image with an image of a previous image frame, dividing the image into first blocks including a dynamic region with a lot of motion and second blocks including a static region with no motion change, decreasing the compression rate of image data corresponding to the first blocks, and increasing the compression rate of image data corresponding to the second blocks, thereby minimizing image quality degradation. Then, the encoder 150 transmits the compressed image to the image transmitter 170.

The image transmitter 170 transmits the compressed image to an exterior. The image transmitter 170 may transmit the compressed image to the gateway 20 or the network 30.

The image processing apparatus 100 according to the embodiment of the inventive concepts may be included in the network camera 10 in FIG. 1, or may also be implemented as a separate apparatus from the network camera 10 in FIG. 1. Some of the components included in the image processing apparatus 100 according to the embodiment of the inventive concepts may be installed in the network camera 10 in FIG. 1, or the others may be installed in a separate apparatus from the network camera 10 in FIG. 1.

In a case where the sharpening technique of the image processor 130 does not consider the compression technique of the encoder 150, when luminance values of image data corresponding to a block including a low-light region, for example, the first image block A of (b) of FIG. 3, or luminance values of image data corresponding to some low-light regions in the second image block B of (b) of FIG. 3 are boosted, invisible low-light noise may also be boosted, resulting in problems that a compression rate is decreased or the quality of an image is degraded.

More specifically, when the sharpening technique is applied, the luminance of an edge portion of an object displayed on one frame image, that is, the second image block B, which is a high-frequency region, is boosted. In such a case, low-light noise, which is included in image data corresponding to the low-light region of the second image block B, may also be boosted. At this time, when the second image block B corresponds to the first block including the dynamic region by the encoder 150, a low data compression rate is applied. In such a case, the low data compression rate is also applied to the boosted low-light noise, and thus the quality of an image may be degraded. The embodiment of the inventive concepts is devised in order to overcome the aforementioned problems, and is characterized in that it is possible to increase a transmission compression rate of image data by suppressing a boosting phenomenon applicable to low-light noise while reducing loss of original image data.

Figure 4:
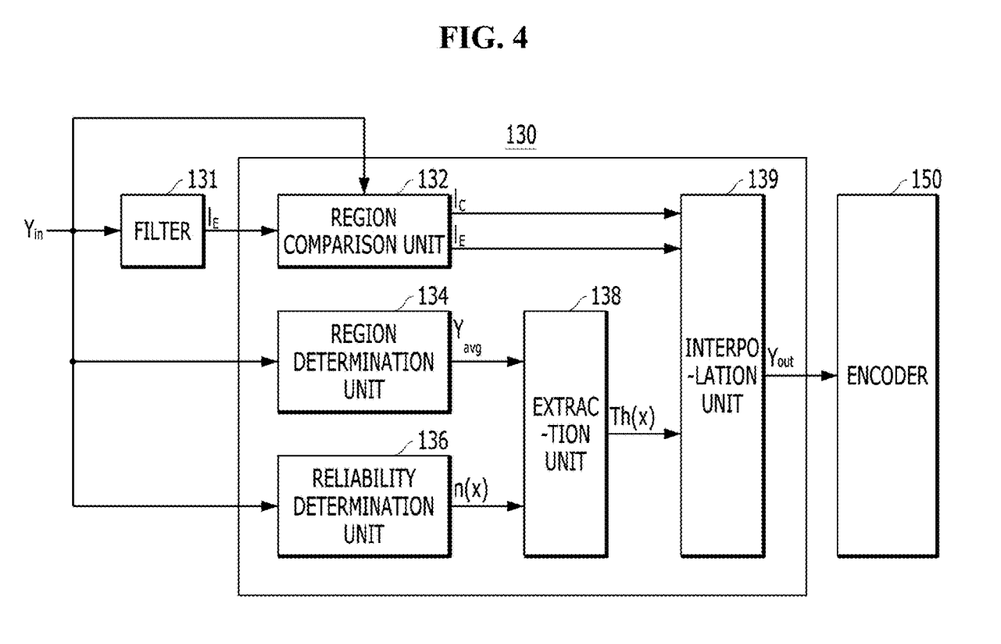
FIG. 4 is a block diagram illustrating a configuration of an image processor of FIG. 2.

FIG. 4 is a block diagram illustrating a configuration of the image processor 130 of FIG. 2.

The image processor 130 may be implemented as a processor, and the processor may be configured to process instructions of a computer program by executing basic arithmetic, logic, and input/output operations. The instructions may be provided to the processor by a memory or a communication module. As an example, the processor may be configured to execute received instructions according to program codes stored in a recording device such as a memory.

Referring to FIG. 4, the image processor 130 may include a region comparison unit 132, a region determination unit 134, a reliability determination unit 136, an extraction unit 138, and an interpolation unit 139. The components in the image processor 130 implemented as the processor, that is, the region comparison unit 132, the region determination unit 134, the reliability determination unit 136, the extraction unit 138, and the interpolation unit 139 may also be understood as expressing different functions performed by the image processor 130 according to control instructions provided by the program codes stored in the image processing apparatus 100.

More specifically, the region comparison unit 132 may perform an operation of receiving first luminance information $Y_{in}$ corresponding to a first image signal and second luminance information $I_E$ corresponding to a second image signal, among image signals received through the image receiver 110, and generating third luminance information $I_C$ by using the first luminance information and the second luminance information. As an example, the first image signal may be an original image signal of a first image block among the received image signals of one frame, and the second image signal may be a filtered first image signal, that is, the image signal of the first image block filtered through a filter 131. Furthermore, the third luminance information may be luminance information generated using the first luminance information and the second luminance information and corresponding to the first image block.

The region determination unit 134 may perform an operation of calculating a brightness level ($Y_{avg}$) value of the first image block corresponding to the first image signal through the first luminance information, and the reliability determination unit 136 may perform an operation of calculating a reliability determination value n(x) for the first image block corresponding to the first image signal by using the first luminance information.

Furthermore, the extraction unit 138 may perform an operation of generating a luminance correction threshold value Th(x) by using the brightness level $Y_{avg}$ of the first image block and the reliability determination value n(x) of the first image block, and the interpolation unit 139 may perform an operation of outputting corrected luminance information $Y_{out}$ corresponding to the first image block by using the luminance correction threshold value and the third luminance information.

The filter 131 illustrated in FIG. 4 may be implemented as the bandpass filter described above. Furthermore, the first image block may be a block region including at least one pixel among image signals constituting one frame. As an example, the first image block may be implemented as a single pixel or may also be implemented as a predetermined region including a plurality of pixels.

First, the operation of the region comparison unit 132 will be described as follows.

As described above, the image data received through the image receiver 110 is image signals of one frame including a plurality of image blocks, and in general, noise is less likely to occur in image blocks corresponding to a bright region in image data of one frame, but noise is highly likely to occur image blocks corresponding to a dark region.

Accordingly, it is preferable to apply a high pass filter because noise less occurs in the image blocks corresponding to the bright region, and it is necessary to minimize boosting of noise by the high pass filter because noises is highly likely to exist in the image blocks corresponding to the dark region even though the noise is invisible.

In this regard, the image processor 130 according to the embodiment of the inventive concepts performs an operation of controlling a halo phenomenon, caused by strong edge boosting, in a high-frequency region (region having a large change in luminance), for example.

The region comparison unit 132 performs an operation of receiving the first luminance information $Y_1$ corresponding to the original image signal of the first image block, among the image signals received through the image receiver 110 and the second luminance information $I_E$ corresponding to the image signal of the first image block filtered through the filter 131, comparing the first luminance information and the second luminance information based on Equation 1 below, and generating the third luminance information $I_C$ corresponding to the first image block.

Equation 1

If $I_E > I_{max}$  $I_C = I_{max}$
Else if $I_E < I_{min}$  $I_C = I_{min}$
Else  $I_C = I_E$ In Equation 1 above, I denotes the luminance information of the first image block, $I_E$ denotes the second luminance information $I_E$ for the filtered first image block, $I_{max}$ denotes a maximum luminance value of the first image block or adjacent image blocks including the first image block, and $I_{an}$ denotes a minimum luminance value of the first image block or adjacent image blocks including the first image block. Furthermore, $I_C$ denotes the third luminance information $I_C$ of the first image block, which is output by the region comparison unit 132, based on Equation 1 above.

According to Equation 1 above, when the second luminance information $I_E$ generated through the filter 131 exceeds the preset maximum luminance value the region comparison unit 132 sets output luminance information to the maximum luminance value, not the second luminance information $I_E$. Furthermore, when the second luminance information $I_E$ generated through the filter 131 is smaller than the preset minimum luminance value $I_{min}$ the region comparison unit 132 sets output luminance information to the minimum luminance value, not the second luminance information $I_E$. As a consequence, the region comparison unit 132 sets the maximum and minimum limits of the second luminance information $I_E$ of the filtered first image block, thereby controlling the halo phenomenon caused when the second luminance information $I_E$ is boosted by the filter.

The region determination unit 134 may perform an operation of determining the brightness level $Y_{avg}$ of the first image block.

More specifically, the region determination unit 134 may calculate the brightness level $(Y_{avg})$ value of the first image block through Equation 2 below.

$$Y_{avg} = \frac{\sum_{11}^{n} Y(x)}{n} \quad \text{Equation 2}$$

Equation 2 above represents the average luminance of the first image block, and the brightness level $(Y_{avg})$ value of the first image block may be calculated as an average value of luminance values for one or more pixels included in the first image block. As an example, when the first image block is implemented as a single pixel, the brightness level $(Y_{avg})$ value of the first image block may be a luminance value of the single pixel, and when the first image block is a predetermined region including a plurality of pixels, the brightness level $(Y_{avg})$ value of the first image block may be an average luminance value for the plurality of pixels.

The reliability determination unit 136 may perform an operation of calculating the reliability determination value n(x) capable of confirming the similarity of the first image block.

More specifically, the reliability determination value n(x) output from the reliability determination unit 136 may be calculated through Equation 3 below, wherein the first image block may be implemented as the single pixel as described above.

$$n(x) = \left| \frac{\sum (Y(x) - Y(x-n))}{x} \right| \quad \text{Equation 3}$$

According to Equation 3 above, the reliability determination value n(x) corresponds to a result obtained by comparing the luminance Y(x) of the first image block (for example, a specific single pixel) and the luminance Y(x-n) of surrounding pixels around the single pixel. When a difference between the luminance of the first image block and the luminance of the surrounding pixels is small, it is determined that similarity is high, and the resultant reliability determination value n(x) is calculated as a low value.

On the other hand, the larger the the difference between the luminance Y(x) of the first image block and the luminance Y(x-n) of the surrounding pixels, it is determined that similarity is low, and the resultant the reliability determination value n(x) is calculated as a high value.

That is, the higher the reliability determination value for the first image block, the higher the probability that the first image block is determined to be noise.

Accordingly, the reliability determination unit 136 performs an operation of calculating the reliability determination value n(x), which is a new variable, in order to increase the reliability of the luminance correction threshold value Th(x) generated by the extraction unit 138. As an example, when the first image block is noise, similarity for the first image block becomes significantly low. Thus, the reliability determination value n(x) may be calculated as a significantly high value, and by obtaining such information in advance, it is possible to increase the reliability of the luminance correction threshold value Th(x) generated by the extraction unit 138.

That is, the luminance correction threshold value Th(x) generated by the extraction unit 138 may not only consider the brightness level of the first image block by the region determination unit 134, but also increase the reliability through a deviation with adjacent pixels.

The extraction unit 138 may perform an operation of generating the luminance correction threshold value Th(x) by using the brightness level $Y_{avg}$ of the first image block, which is output from the region determination unit 134, and the reliability determination value n(x) output from the reliability determination unit 136.

More specifically, the extraction unit 138 may calculate the luminance correction threshold value Th(x) through Equation 4 below.

$$Th(x)=n(x)*k^{-(Yavg)} \qquad \text{Equation 4}$$

In Equation 4 above, k denotes an arbitrary constant, n(x) denotes a reliability determination value of a specific pixel constituting the first image block to be searched, and the reliability of the luminance correction threshold value Th(x) according to Equation 4 above may be determined using the value of n(x).

According to Equation 4 above, the luminance correction threshold value Th(x) is directly proportional to the reliability determination value n(x) and is inversely proportional to the brightness level $Y_{avg}$ of the first image block. Furthermore, according to Equation 4 above, the luminance correction threshold value Th(x) is included in a range larger than 0 and smaller than 1 (0<Th(x)<1).

As an example, when the first image block to be searched is noise, similarity for the first image block becomes significantly low. Thus, the reliability determination value n(x) may be calculated as a significantly high value and the luminance correction threshold value Th(x) may be extracted as a high value close to 1.

On the other hand, when the first image block is included in a bright region and has a high similarity with surrounding pixels, the reliability determination value n(x) may be calculated as a low value and the luminance correction threshold value Th(x) may be extracted as a low value close to 0.

Accordingly, the extraction unit 138 may calculate a flexible luminance correction threshold value according to a noise level in a low-light environment by using the brightness level $Y_{avg}$ of the first image block and the reliability determination value n(x) of the first image block. Last, the interpolation unit 139 may output the corrected luminance information $Y_{out}$ corresponding to the first image block by using the luminance correction threshold value Th(x) and the third luminance information $I_C$.

More specifically, the interpolation unit 139 may calculate the corrected luminance information $Y_{out}$ corresponding to the first image block through Equation 5 below.

$$Y_{out}=I_C*Th(x)+I_E*(1-Th(x)) \qquad \text{Equation 5}$$

In Equation 5 above, $I_E$ denotes the second luminance information $I_E$ for the filtered first image block, and $I_C$ denotes the third luminance information $I_C$ of the first image block, which is output from the region comparison unit 132, based on Equation 1 above. Furthermore, Th(x) denotes the luminance correction threshold value generated by the extraction unit 138.

As briefly described above, in order to control the halo phenomenon, caused by strong edge boosting, in the high-frequency region (region having a large change in luminance) via the filter 131, the region comparison unit 132 outputs the filtered second luminance information $I_E$ or the third luminance information $I_C$, which is limited to a maximum or minimum luminance value, by using an anti-halo technique as in Equation 1 above.

The interpolation unit 139 receives the second luminance information $I_E$ and the third luminance information $I_C$ output from the region comparison unit 132 and the luminance correction threshold value Th(x) generated by the extraction unit 138, and calculates the corrected luminance information $Y_{out}$ corresponding to the first image block according to Equation 5 above, thereby controlling fine noise while preventing the image quality of an image signal from being degraded.

For example, when the first image block is a bright region with a high similarity, a low reliability determination value n(x) is output from the reliability determination unit 136, and thus the correction threshold value Th(x) may be extracted as a low value close to 0.

Accordingly, according to Equation 5 above, the correction threshold value Th(x) has a value close to 0. Thus, the corrected luminance information $Y_{out}$ may be hardly affected by the third luminance information $I_C$ and may be corrected to and output as a value corresponding to the second luminance information $I_E$.

In other words, when the first image block is included in a bright region and has a high similarity with surrounding pixels, it is determined that the first image block is not noise and the second luminance information $I_E$ having passed through the high pass filter part of the filter 131 may be controlled to be transmitted to the encoder 150.

On the other hand, when the first image block is a dark region with a low similarity, a high reliability determination value n(x) is output from the reliability determination unit 136, and thus the correction threshold value Th(x) may be extracted as a high value close to 1.

Therefore, according to Equation 5 above, since the correction threshold value Th(x) has a value close to 1, the corrected luminance information $Y_{out}$ may be hardly affected by the second luminance information $I_E$ and may be corrected and output as a value corresponding to the third luminance information $I_C$.

In other words, when the first image block is included in a dark region and has a low similarity with surrounding pixels, it may be determined that low-light noise is highly likely to exist. Thus, the third luminance information $I_C$ limited to a maximum or minimum luminance value may be controlled to be transmitted to the encoder 150.

In other words, the filtered second luminance information $I_E$ output from the region comparison unit 132 and the third luminance information $I_C$ limited to the maximum or minimum luminance value reflect a result value obtained by applying the anti-halo technique and a result value obtained by applying the edge boosting and the luminance correction threshold value Th(x) generated by the extraction unit 138 is a value that reflects the brightness level $Y_{avg}$ of the first image block and the reliability determination value n(x). Consequently, according to the embodiment of the inventive concepts, the corrected luminance information $Y_{out}$ is transmitted to the encoder 150, so that it is possible to increase a transmission compression rate of image data by suppressing a boosting phenomenon applicable to low-light noise while reducing loss of original image data.

Figure 5:
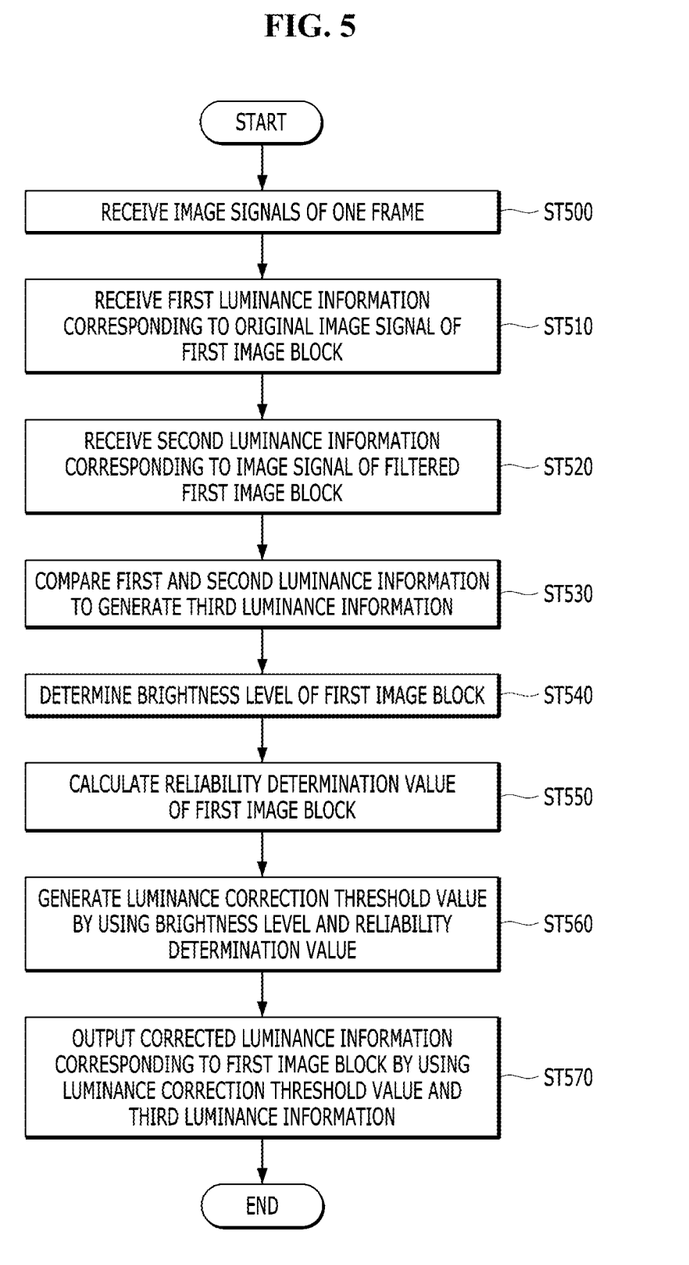
FIG. 5 is a flowchart illustrating an image processing method according to an embodiment of the inventive concepts.

FIG. 5 is a flowchart illustrating an image processing method according to the embodiment of the inventive concepts.

With reference to FIG. 2, FIG. 3, and FIG. 5, the image processing method according to the embodiment of the inventive concepts will be described as follows.

First, the image receiver 110 receives image signals of one frame including a plurality of image blocks (ST 500). Furthermore, the image receiver 110 may output the received image signals and luminance information corresponding to the image signal to the image processor 130.

Then, the region comparison unit 132 of the image processor 130 receives the first luminance information $Y_1$ corresponding to the original image signal of the first image block among the image signals received through the image receiver 110 (ST 510).

Furthermore, the region comparison unit 132 may receive the second luminance information $I_E$ corresponding to the image signal of the first image block filtered through the filter 131 (ST 520), and compare the first luminance information and the second luminance information to generate the third luminance information $I_C$ corresponding to the first image block (ST 530).

More specifically, the region comparison unit 132 may perform an operation of comparing the first luminance information and the second luminance information based on Equation 1 described above and generating the third luminance information $I_C$ corresponding to the first image block. Through such an operation, the region comparison unit 132 may set the maximum and minimum limits of the second luminance information $I_E$ of the filtered first image block, thereby controlling the halo phenomenon caused by the boosting of the second luminance information $I_E$.

Then, the region determination unit 134 may perform an operation of determining the brightness level $Y_{avg}$ of the first image block (ST 540). More specifically, the region determination unit 134 may calculate the brightness level $Y_{avg}$ of the first image block through Equation 2 described above.

Furthermore, the reliability determination unit 136 may perform an operation of calculating the reliability determination value n(x) of the first image block (ST 550). More specifically, the reliability determination unit 136 may calculate the reliability determination value n(x) of the first image block through Equation 3 described above.

Next, the extraction unit 138 may perform an operation of generating the luminance correction threshold value Th(x) by using the brightness level $Y_{avg}$ of the first image block and the reliability determination value n(x) of the first image block (ST 560). More specifically, the extraction unit 138 may calculate the luminance correction threshold value Th(x) through Equation 4 described above.

Last, the interpolation unit 139 may output the corrected luminance information $Y_{out}$ corresponding to the first image block by using the luminance correction threshold value Th(x) and the third luminance information $I_C$ (ST 570). More specifically, the interpolation unit 139 may calculate the corrected luminance information $Y_{out}$ corresponding to the first image block through Equation 5 described above.

In accordance with the image processing method according to the embodiment of the inventive concepts described above, the corrected luminance information $Y_{out}$ is generated using the result value (the third luminance information $I_C$) obtained by applying the anti-halo technique, the result value (the filtered second luminance information $I_E$) obtained by applying the edge boosting, and the luminance correction threshold value Th(x) generated by reflecting the brightness level $Y_{avg}$ of the first image block and the reliability determination value n(x) of the first image block, and is transmitted to the encoder 150, so that it is possible to increase a transmission compression rate of image data by suppressing a boosting phenomenon applicable to low-light noise while reducing loss of original image data.

As described above, although the inventive concepts have been described with reference to particular matters such as specific components, the limited embodiments, and the drawings, they are provided only for assisting in the entire understanding of the present disclosure. Therefore, the inventive concepts are not limited to the exemplary embodiments, and various modifications and changes may be made from this description by those skilled in the art to which the present disclosure pertains.

Therefore, the inventive concepts should not be limited to the above-described exemplary embodiments, and it should be noted that the following claims as well as all modified equally or equivalently to the claims fall within the scope and of the disclosure.

What is claimed is:

1. An image processing apparatus, comprising:
   a processor; and
   a memory configured to store program instructions to be executed by the processor,
   the program instructions, when executed by the processor, being configured to implement:
   an image receiver configured to receive a first image signal;
   a filter configured to filter the first image signal to obtain a second image signal;
   a region comparer configured to obtain first luminance information corresponding to the first image signal and second luminance information corresponding to the second image signal, and to generate third luminance information by using the first luminance information and the second luminance information;
   a region determinator configured to calculate a brightness level value for the first image signal by using the first luminance information;
   a reliability determinator configured to calculate a reliability determination value for the first image signal by using the first luminance information;
   an extractor configured to generate a luminance correction threshold value of the first image signal by using the brightness level value of the first image signal, which is output from the region determinator, and the reliability determination value of the first image signal which is output from the reliability determinator; and
   an interpolator configured to output corrected luminance information for the first luminance information by using the luminance correction threshold value and the third luminance information.

2. The image processing apparatus according to claim 1, wherein the region comparer is configured to generate the third luminance information IC through Equation 1 below, $$
\begin{array}{ll}
\text{If} & I_E > I_{max} \; I_C = I_{max} \\
\text{Else if} & I_E < I_{min} \; I_C = I_{min} \\
\text{Else} & I_C = I_E
\end{array}
\quad \text{Equation 1}
$$

in Equation 1 above, $I_E$ denotes the second luminance information, $I_{max}$ denotes a maximum luminance value of image blocks including the first image signal $I_{min}$ denotes a minimum luminance value of the image blocks including the first image signal, and $I_C$ denotes the third luminance information.

3. The image processing apparatus according to claim 1, wherein the first image signal comprises an original image signal of a first image block among received image signals of one frame, and
the second image signal comprises an image signal of the first image block, which is filtered by the filter.

4. The image processing apparatus according to claim 3, wherein the extractor is configured to calculate the luminance correction threshold value through Equation 4 below, $$Th(x)=n(x)*k^{-(Yavg)} \quad \text{Equation 4}$$

in Equation 4 above, $Y_{avg}$ denotes the brightness level value calculated by the region determinator, $n(x)$ denotes the reliability determination value calculated by the reliability determinator, and k denotes an arbitrary constant, and
Th(x) is the luminance correction threshold value included in a range larger than 0 and smaller than 1.

5. The image processing apparatus according to claim 4, wherein, as a difference between luminance of the first image block and luminance of surrounding pixels of the first image block is larger, the first image block is determined to be noise and the luminance correction threshold value is calculated as a high value close to 1.

6. The image processing apparatus according to claim 4, wherein the interpolator is configured to calculate the corrected luminance information for the first luminance information $Y_{in}$ through Equation 5 below, $$Y_{out}=I_C*Th(x)+I_E*(1-Th(x)) \quad \text{Equation 5}$$

in Equation 5 above, $I_C$ denotes the third luminance information, $Y_{out}$ denoted the corrected luminance information, Th(x) denotes the luminance correction threshold value, and IE denotes the second luminance information.

7. The image processing apparatus according to claim 3, wherein the reliability determinator is configured to calculate the reliability determination value as corresponding to a result obtained by comparing luminance of the first image block and luminance of surrounding pixels of the first image block, and
as a difference between the luminance of the first image block and the luminance of the surrounding pixels is smaller, a low reliability determination value is calculated, and as the difference between the luminance of the first image block and the luminance of the surrounding pixels is larger, a high reliability determination value is calculated.

8. The image processing apparatus according to claim 3, wherein the first image block comprises a single pixel or a predetermined region including a plurality of pixels.

9. The image processing apparatus according to claim 3, wherein the filter comprises a bandpass filter.

10. The image processing apparatus according to claim 3, wherein the region determinator is configured to calculate the brightness level value as an average luminance value of the first image block.

11. An image processing method performed by an apparatus having a processor and a memory configured to store program instructions to be executed by the processor, the method comprising the steps of:
receiving a first image signal;
filtering by a filter the first image signal to obtain a second image signal;
obtaining first luminance information corresponding to the first image signal and second luminance information corresponding to the second image signal, and generating third luminance information by using the first luminance information and the second luminance information;
calculating a brightness level value for the first image signal by using the first luminance information;
calculating a reliability determination value for the first image signal by using the first luminance information;
generating a luminance correction threshold value of the first image signal by using the brightness level value of the first image signal and the reliability determination value of the first image signal; and
outputting corrected luminance information for the first luminance information by using the luminance correction threshold value and the third luminance information.

12. The image processing method according to claim 11, wherein the third luminance information $I_C$ is generated through Equation 1 below, $$
\begin{array}{ll}
\text{If} & I_E > I_{max} \; I_C = I_{max} \\
\text{Else if} & I_E < I_{min} \; I_C = I_{min} \\
\text{Else} & I_C = I_E
\end{array}
\quad \text{Equation 1}
$$

in Equation 1 above, $I_E$ denotes the second luminance information, $I_{max}$ denotes a maximum luminance value of image blocks including the first image signal, $I_{min}$ denotes a minimum luminance value of the image blocks including the first image signal, and $I_C$ denotes the third luminance information.

13. The image processing method according to claim 11, wherein the first image signal is an original image signal of a first image block among received image signals of one frame.

14. The image processing method according to claim 13, wherein the second image signal is an image signal of the first image block, which is filtered by the filter.

15. The image processing method according to claim 13, wherein the first image block is implemented as a single pixel or is implemented as a predetermined region including a plurality of pixels.

16. The image processing method according to claim 13, wherein the brightness level value is an average luminance value of the first image block.

17. The image processing method according to claim 13, wherein the reliability determination value corresponds to a result obtained by comparing luminance of the first image block and luminance of surrounding pixels of the first image block, and as a difference between the luminance of the first image block and the luminance of the surrounding pixels is smaller, a low reliability determination value is calculated, and as the difference between the luminance of the first image block and the luminance of the surrounding pixels is larger, a high reliability determination value is calculated.

18. The image processing method according to claim 13, wherein the luminance correction threshold value Th(x) is calculated through Equation 4 below, $$Th(x) = n(x) * k^{-(Yavg)} \qquad \text{Equation 4}$$

in Equation 4 above, $Y_{avg}$ denotes the brightness level value calculated by a region determinator, n(x) denotes the reliability determination value calculated by a reliability determinator, and k denotes an arbitrary constant, and Th(x) is the luminance correction threshold value Th(x) included in a range larger than 0 and smaller than 1.

19. The image processing method according to claim 18, wherein, as a difference between luminance of the first image block and luminance of surrounding pixels of the first image block is larger, the first image block is determined to be noise and the luminance correction threshold value is calculated as a high value close to 1.

20. The image processing method according to claim 18, wherein the corrected luminance information for the first luminance information is calculated through Equation 5 below, $$Y_{out} = I_C * Th(x) + I_E * (1 - Th(x)) \qquad \text{Equation 5}$$

in Equation 5 above, $I_C$ denotes the third luminance information, $Y_{out}$ denotes the corrected luminance information, Th(x) denotes the luminance correction threshold value, and IE denotes the second luminance information.

\* \* \* \* \*